US012577059B2

(12) United States Patent (10) Patent No.: US 12,577,059 B2
Araki (45) Date of Patent: Mar. 17, 2026

(54) TRANSPORT DEVICE

(71) Applicant: DAIFUKU CO., LTD., Osaka (JP)

(72) Inventor: Kazutaka Araki, Hino-cho (JP)

(73) Assignee: DAIFUKU CO., LTD., Osaka (JP)

( * ) Notice: Subject to any disclaimer, the term of this patent is extended or adjusted under 35 U.S.C. 154(b) by 64 days.

(21) Appl. No.: 18/710,894

(22) PCT Filed: Mar. 29, 2022

(86) PCT No.: PCT/JP2022/015351
§ 371 (c)(1),
(2) Date: May 16, 2024

(87) PCT Pub. No.: WO2023/089844
PCT Pub. Date: May 25, 2023

(65) Prior Publication Data
US 2025/0019179 A1 Jan. 16, 2025

(30) Foreign Application Priority Data

Nov. 19, 2021 (JP) ................................. 2021-188238

(51) Int. Cl.
B65G 43/08 (2006.01)
(52) U.S. Cl.
CPC ...... B65G 43/08 (2013.01); *B65G 2201/0258* (2013.01); *B65G 2203/0216* (2013.01); *B65G 2203/041* (2013.01)
(58) Field of Classification Search
CPC ........... B65G 43/08; B65G 2201/0258; B65G 2203/0216; B65G 2203/041

USPC ....................................................... 198/502.2
See application file for complete search history.

(56) References Cited

U.S. PATENT DOCUMENTS

| 6,279,721 B1 | 8/2001 | Lyngso et al. |
| 2008/0236108 A1 | 10/2008 | Parmley et al. |
| 2021/0046646 A1 | 2/2021 | Prechtl et al. |

FOREIGN PATENT DOCUMENTS

| JP | 3-53911 U1 | 5/1991 |
| JP | H06027718 U | 4/1994 |
| JP | H08053221 A | 2/1996 |
| JP | 3538226 B | 6/2004 |
| JP | 2018-162132 A | 10/2018 |
| SU | 1712270 A1 | 2/1992 |

(Continued)

OTHER PUBLICATIONS

JPH0627718 Description Apr. 1994.*

(Continued)

*Primary Examiner* — Gene O Crawford
*Assistant Examiner* — Lester Rushin, III
(74) *Attorney, Agent, or Firm* — RENNER, OTTO, BOISSELLE & SKLAR, LLP

(57) ABSTRACT

A transport device transports a plurality of trays of different types on which articles can be placed. The transport device includes a tray identification sensor that identifies the types of trays, and protrusion detection sensors that detect articles that are placed protruding from the trays. The tray identification sensor identifies the types of trays by detecting the characteristics of the trays. The protrusion detection sensors detect the articles according to the types of the trays identified by the tray identification sensor.

6 Claims, 7 Drawing Sheets

(56) References Cited

FOREIGN PATENT DOCUMENTS

WO        2019169420  A1      9/2019

OTHER PUBLICATIONS

CN220986289 May 2024.*
CN 118154566 Jun. 2024.*
Extended European Search Report issued in European Patent Application No. 22895133.1 dated Feb. 10, 2025.
International Search Report from corresponding International Patent Application No. PCT/JP22/15351, dated Jun. 21, 2022.
Official Action and Search Report issued in related Russian Patent Application No. 2024116639 dated May 21, 2025.

* cited by examiner

F I G .  2
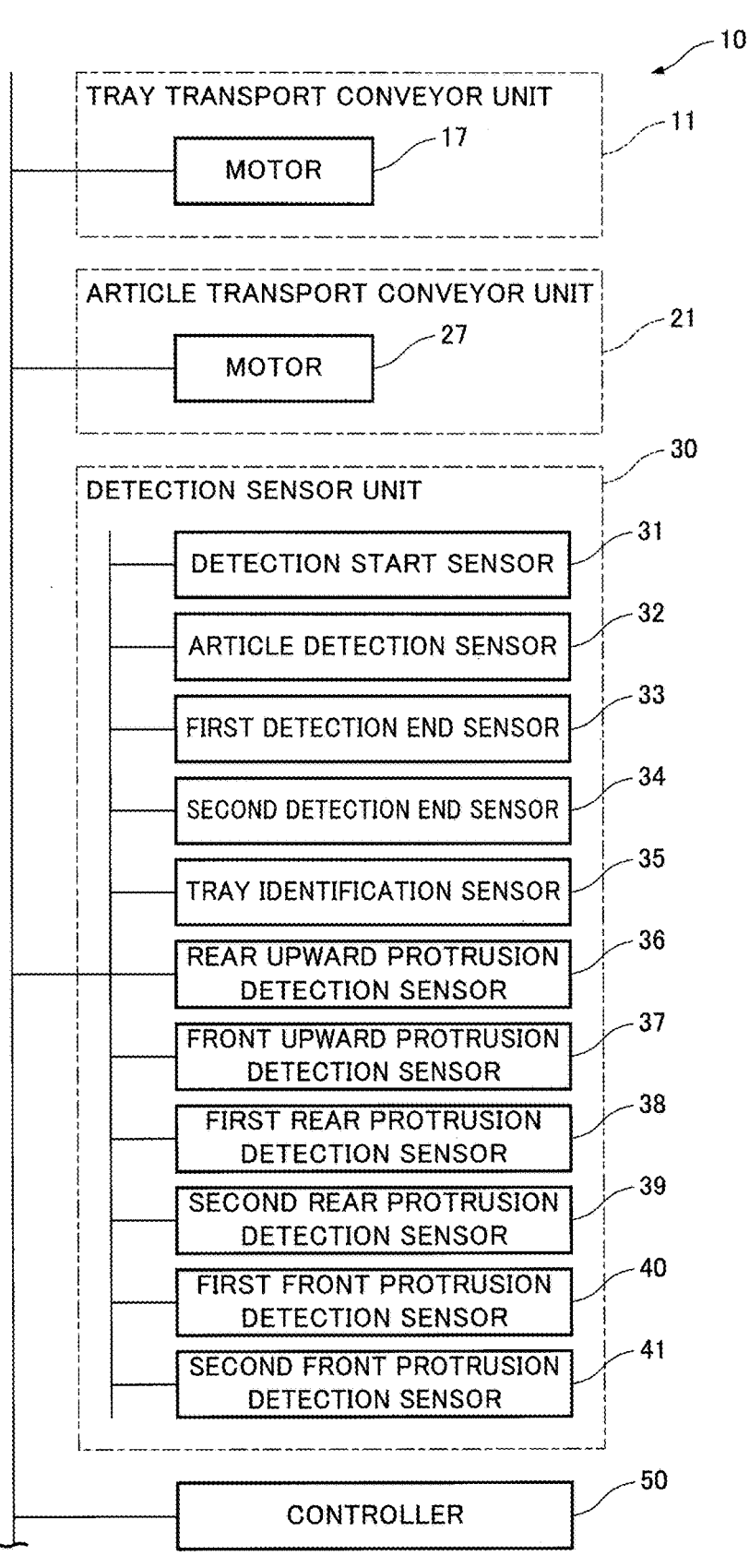

F I G.  3 A
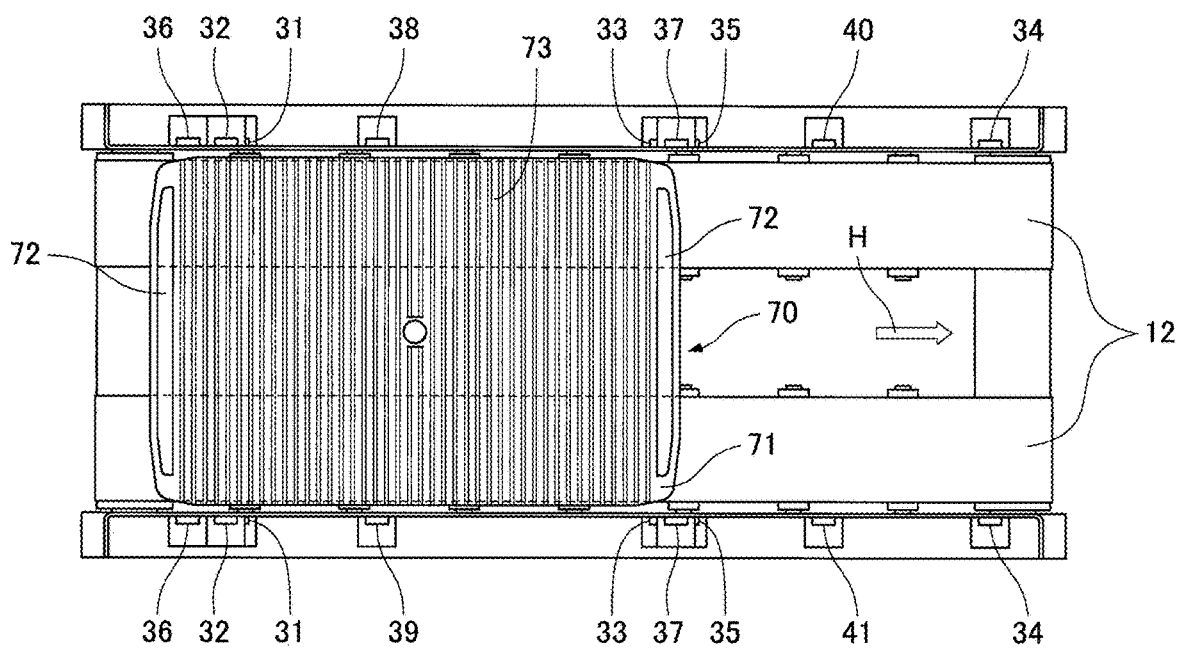
F I G.  3 B
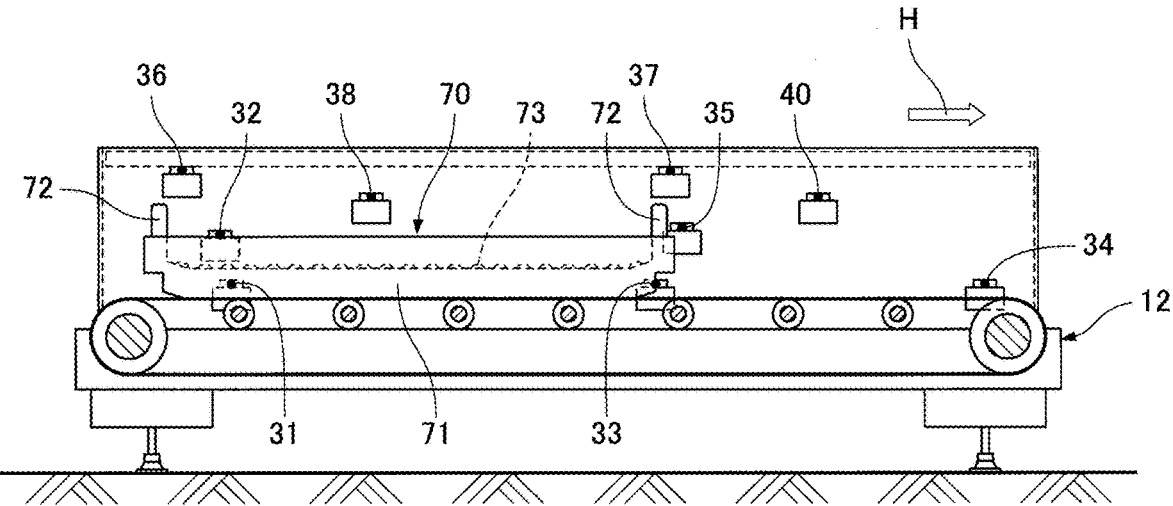

F I G.   5 A
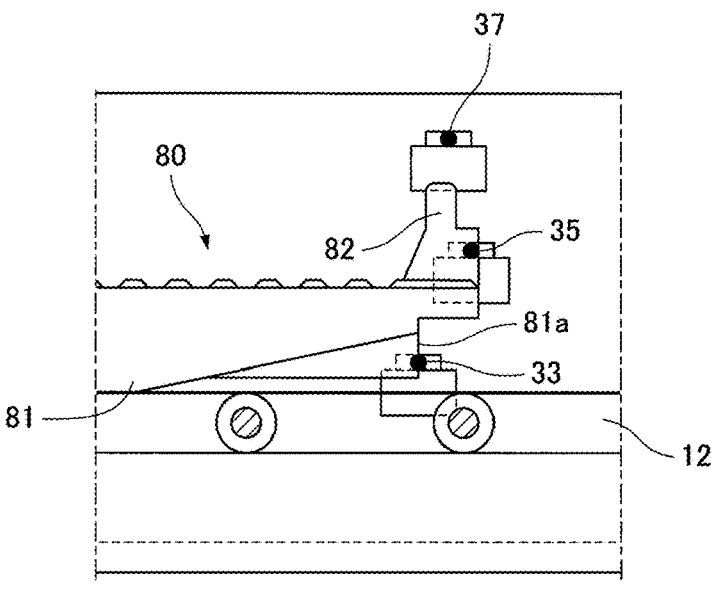
F I G.   5 B
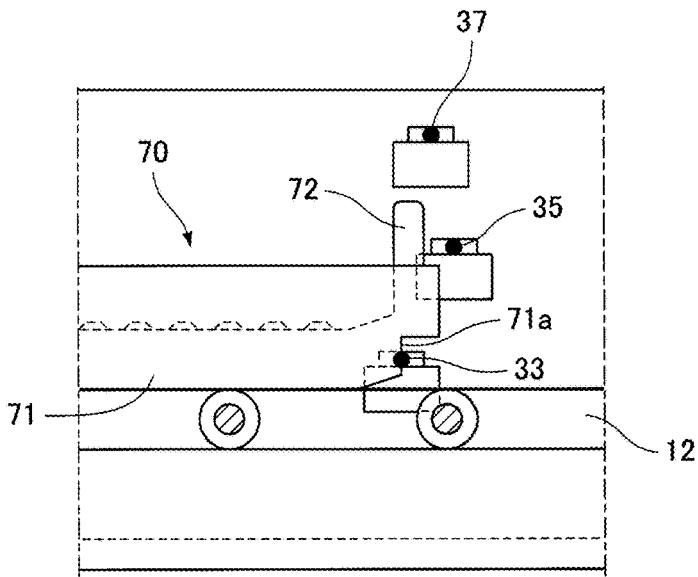

F I G.  6
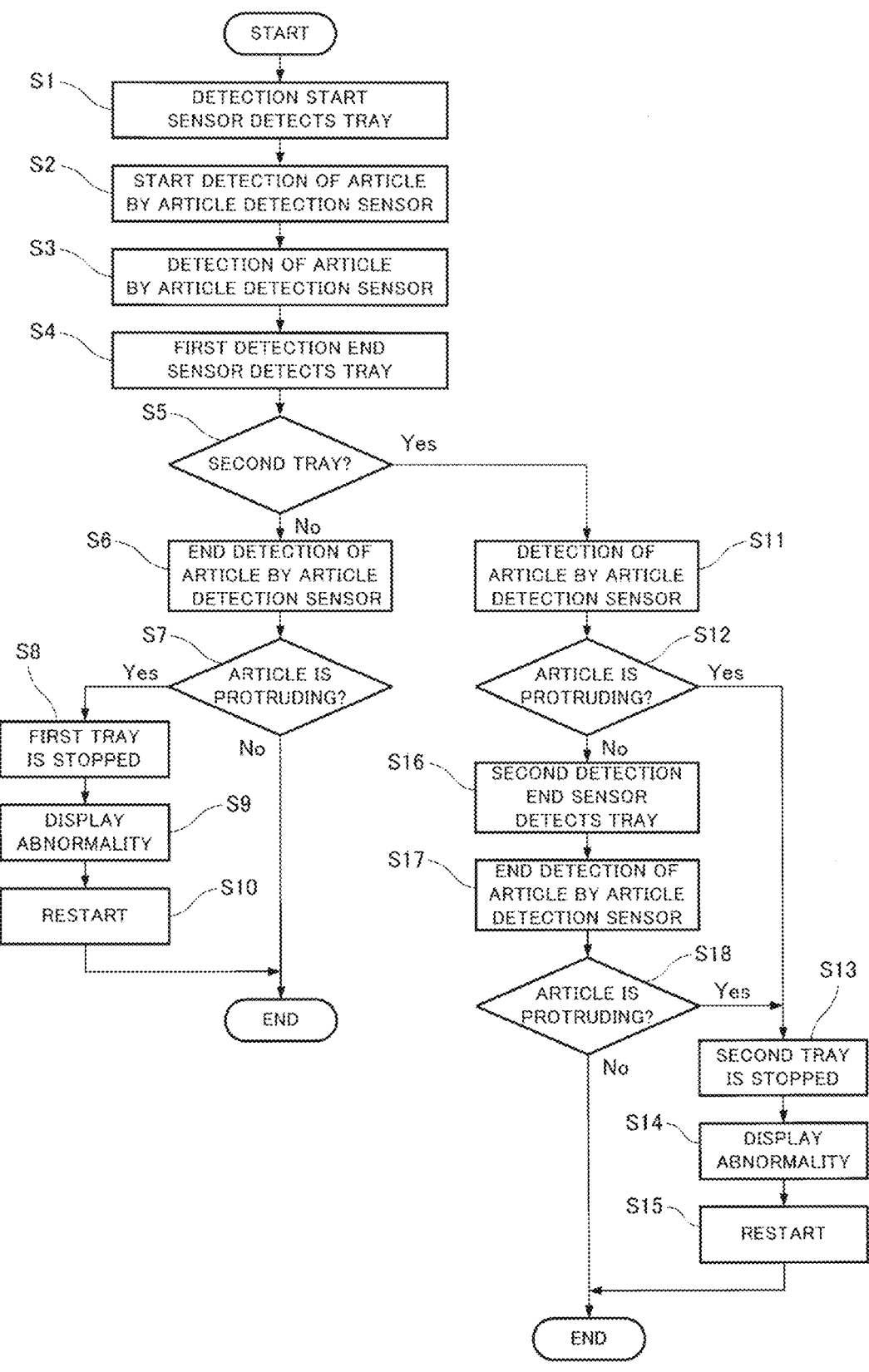

F I G.  7
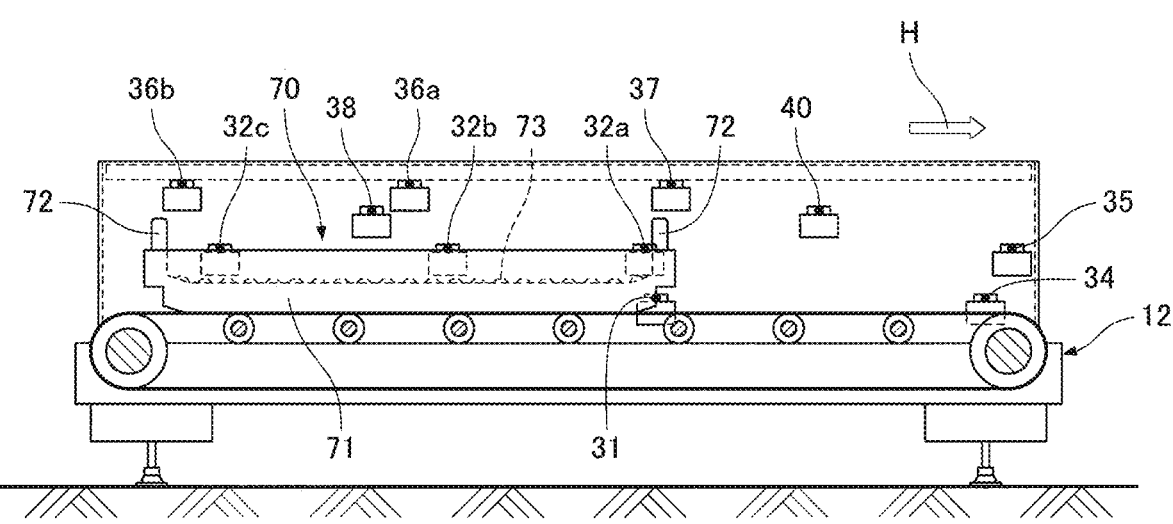

TRANSPORT DEVICE

FIELD OF THE INVENTION

The present invention relates to a transport device that transports a plurality of trays of different types on which articles can be placed.

BACKGROUND OF THE INVENTION

Conventionally, as a transport device that transports trays on which articles are placed, there is a transport device as illustrated in Japanese Patent Laid-Open No. 2018-162132. The transport device in Japanese Patent Laid-Open No. 2018-162132 is a tray transport system in an airport for transporting articles to target airplanes and the like. The transport device in Japanese Patent Laid-Open No. 2018-162132 includes trays on which articles are placed, a transport mechanism that transports the trays on which the articles are placed to destinations, a storage mechanism that stores the trays, and an inspection mechanism that inspects the articles.

In the conventional transport device as illustrated in Japanese Patent Laid-Open No. 2018-162132, articles are transported by fixed length trays, regardless of the size and the like of the articles to be transported.

On the other hand, in the conventional transport device, articles placed on trays may be transported in states where the articles are protruding from the trays. Therefore, in the conventional transport device, the protrusion of the articles from the trays is detected by sensors and the like arranged at positions that are determined according to the trays.

However, in the conventional transport device, only trays of the same type are transported in the same transport line, and the sensors and the like that detect the protrusion of the articles from the trays are arranged at positions that are fixed for each type of tray. Therefore, when transporting articles of different sizes, it has been unfortunately necessary to form a transport line for each type of tray corresponding to the size of articles to be transported, or to unify the trays to be used into trays that can transport articles of the maximum size, leading to the problem that articles of different sizes cannot be efficiently transported. Accordingly, a transport device is desired that can transport a plurality of trays of different types in a mixed condition in the same transport line.

Therefore, an object of the present invention is to provide a transport device that can transport a plurality of trays of different types in a mixed condition in the same transport line.

SUMMARY OF THE INVENTION

The problem to be solved by the present invention is as described above, and solutions to the problem will be described next.

That is, a transport device of the present invention is a transport device that transports a plurality of trays of different types on which articles can be placed, the transport device including a tray identification unit that identifies the types of the trays, and a protrusion detection unit that detects the articles placed protruding from the trays, wherein the tray identification unit identifies the types of the trays by detecting the characteristics of the trays, and the protrusion detection unit detects the articles according to the types of the trays identified by the tray identification unit.

In the above-described configuration, the protrusion detection unit detects the articles according to the types of trays that are identified by the tray identification unit based on the characteristics of the trays.

In the above-described transport device of the present invention, the tray identification unit preferably identifies the types of the trays by detecting the shapes of the trays.

In the above-described configuration, the types of the trays are identified by the shapes of the trays.

In the above-described transport device of the present invention, the tray identification unit preferably identifies the types of the trays by measuring the dimensions of the trays.

In the above-described configuration, the types of the trays are identified by the dimensions of the trays.

In the above-described transport device of the present invention, the tray identification unit preferably identifies the types of the trays by detecting identifiers provided to the trays.

In the above-described configuration, the types of the trays are identified by the identifiers provided to the trays.

The above-described transport device of the present invention preferably includes a photographing unit that photographs the trays, and the tray identification unit preferably identifies the types of the trays based on images photographed by the photographing unit.

In the above-described configuration, the types of the trays are identified by the images photographed by the photographing unit.

In the above-described transport device of the present invention, the protrusion detection unit preferably detects the protrusion of the articles from the front and rear ends of the trays with respect to the transport direction of the trays.

In the above-described configuration, the protrusion of the articles from the front and rear ends of the trays is detected by the protrusion detection unit.

In the above-described transport device of the present invention, the protrusion detection unit preferably changes the detection range of the articles protruding from the front and rear ends of the trays with respect to the transport direction of the trays, according to the types of the trays identified by the tray identification unit.

In the above-described configuration, the detection range of the articles protruding from the front and rear ends of the trays is changed according to the types of the trays identified by the tray identification unit.

According to the transport device of the present invention, the protrusion of the articles from the trays can be detected after identifying the types of the trays from the characteristics of the trays. Therefore, even when a plurality of trays of different types are transported in a mixed condition, the protrusion of the articles from the trays can be accurately detected according to the types of the trays.

BRIEF DESCRIPTION OF DRAWINGS

FIG. 2 is a block diagram illustrating each configuration of the transport device according to the present invention.

FIG. 3A is a plan view of a first tray, which is an example of a tray transported by the transport device according to the present invention.

FIG. 3B is a side view of the first tray, which is the example of the tray transported by the transport device according to the present invention.

FIG. 5A is an enlarged view of a front end portion of the first tray at the time when a tray identification sensor of the transport device according to the present invention identifies the first tray.

FIG. 5B is an enlarged view of a front end portion of the second tray at the time when the tray identification sensor of the transport device according to the present invention identifies the second tray.

FIG. 6 is a flowchart for detecting the protrusion of articles in the trays (the first tray and the second tray) transported by the transport device according to the present invention.

FIG. 7 is a side view illustrating another example of a detection sensor unit of the transport device according to the present invention.

DETAILED DESCRIPTION OF THE INVENTION

A transport device 10 of the present invention will be described. Note that the present invention is not limited to the transport device 10 illustrated below.

The transport device 10 is, for example, a device used in a baggage transport system that performs sorting and transportation of baggage (an example of "article") from receiving the baggage from passengers in an airport until the baggage is loaded onto airplanes on which the passengers are scheduled to board. Note that the transport device 10 is not limited to the device used in the baggage transport system in the airport, and may be a device used in a system that performs sorting and a transportation of articles.

Figure 1:
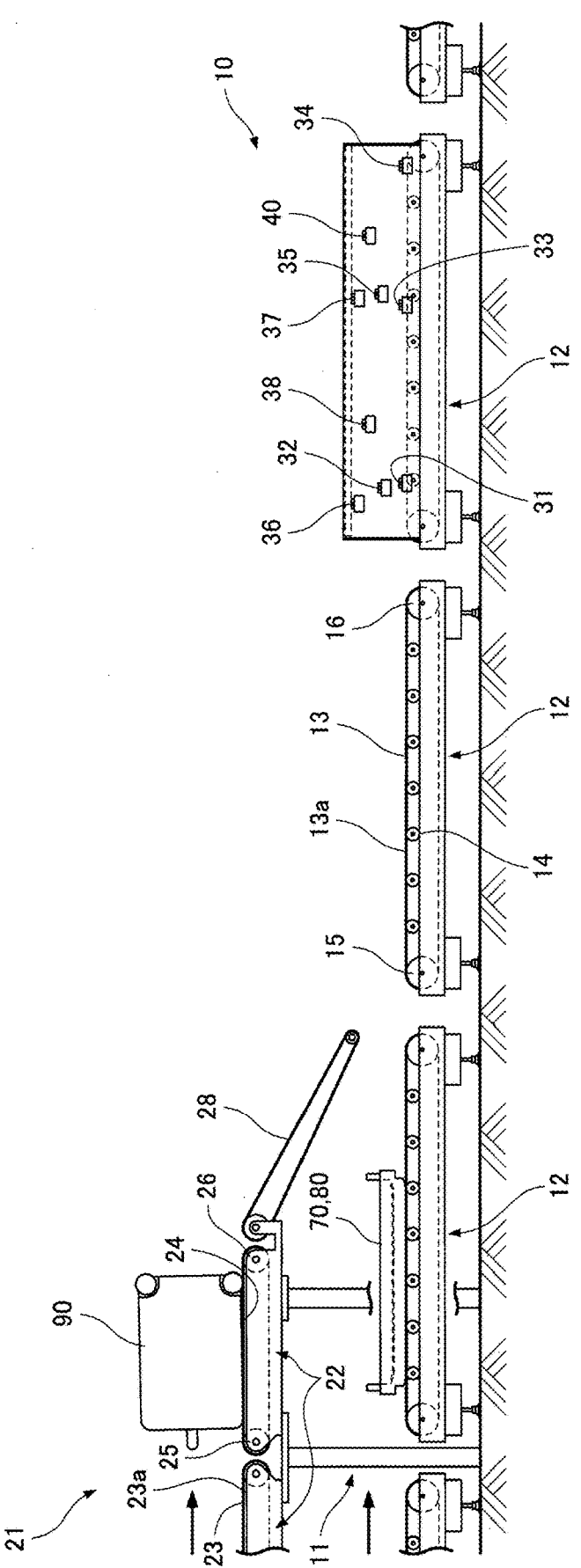
FIG. 1 is a side view of a transport device according to the present invention.

As illustrated in FIG. 1 and FIG. 2, the transport device 10 mainly includes a conveyor unit 11 for transporting a plurality of trays that transports a first tray 70 (an example of "tray") and a second tray 80 (another example of "tray"), an article transport conveyor unit 21 that transports an article 90, a detection sensor unit 30 that detects the first tray 70 and the second tray 80, and the article 90 placed on the first tray 70 or the second tray 80, and a controller 50 that controls the entire transport device 10. In the transport device 10, the article 90 is transported by the article transport conveyor unit 21 provided above the tray transport conveyor unit 11. Further, the article 90 transported by the article transport conveyor unit 21 is fed from an end of the article transport conveyor unit 21 to the first tray 70 or the second tray 80. Accordingly, the article 90 is placed on the first tray 70 or the second tray 80 to be transported by the tray transport conveyor unit 11. While the first tray 70 and the second tray 80 on which articles 90 are placed are transported by the tray transport conveyor unit 11, either one of the first tray 70 and the second tray 80 is detected, and the article 90 placed on the first tray 70 or the second tray 80 is detected by the detection sensor unit 30.

The transport device 10 transports the first tray 70 and the second tray 80 along a transport path. Note that the trays transported by the transport device 10 are not limited to the first tray 70 and the second tray 80. The first tray 70 and the second tray 80 are formed so that the article 90 can be placed thereon.

As illustrated in FIG. 3A and FIG. 3B, the first tray 70 is formed into a rectangle (oblong) shape in its plan view, the length along with a front and rear direction, which serves as a transport direction H, being longer than the width in a left and right direction. The first tray 70 is constituted by a tray body 71 and a pair of front and rear flanges 72. The pair of front and rear flanges 72 are provided to protrude along the left and right direction of the tray body 71 from both ends of the tray body 71 in the front and rear direction. An article placement portion 73 for placing the article 90 is formed on an upper surface of the tray body 71 and between the pair of front and rear flanges 72.

Figure 4A:
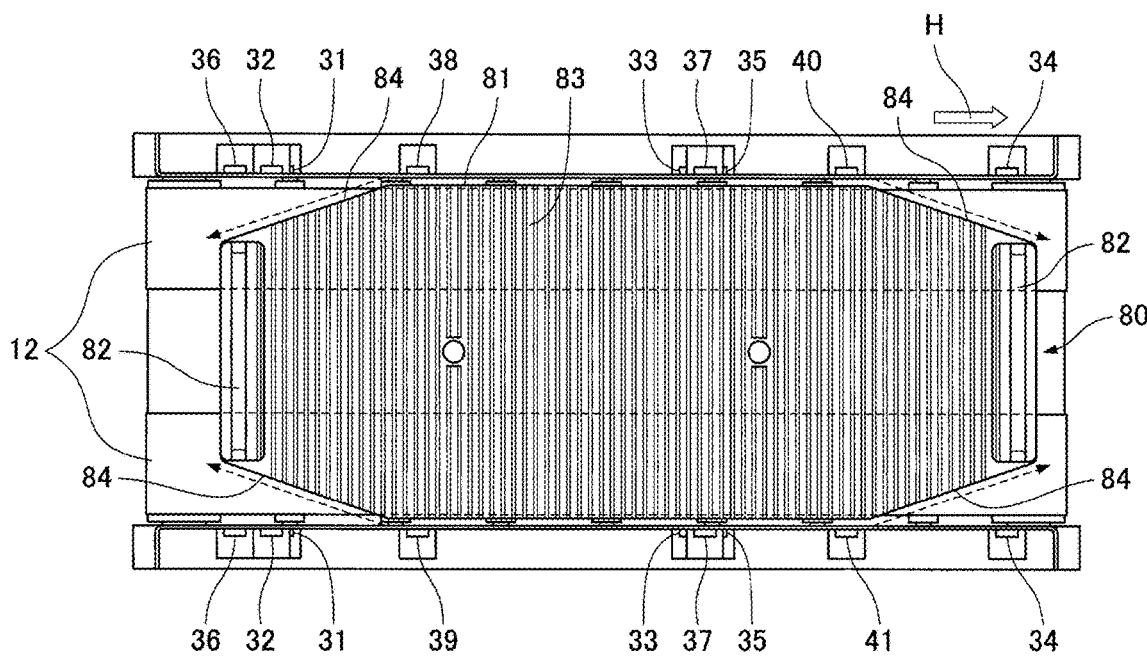
FIG. 4A is a plan view of a second tray, which is another example of the tray transported by the transport device according to the present invention.
Figure 4B:
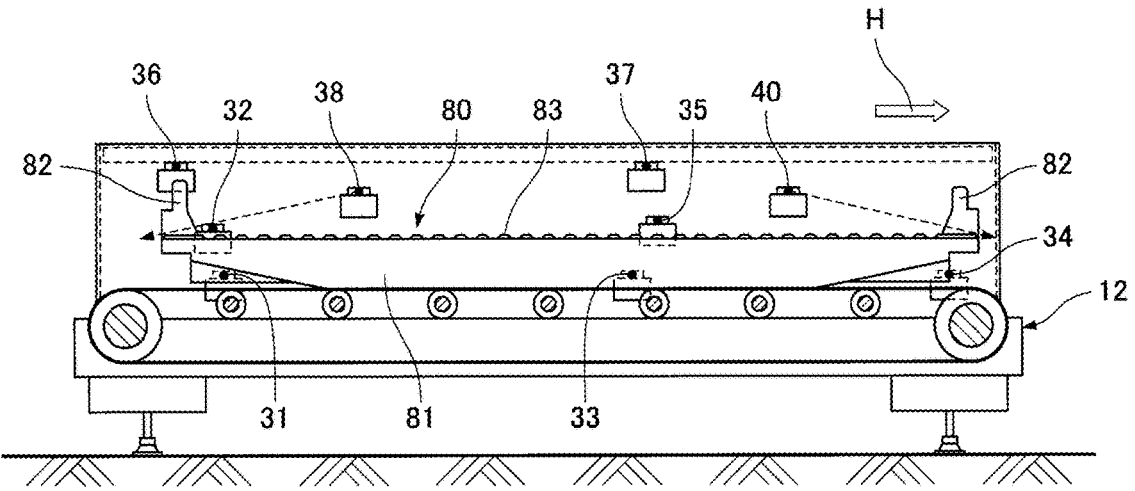
FIG. 4B is a side view of the second tray, which is another example of the tray transported by the transport device according to the present invention.

As illustrated in FIG. 4A and FIG. 4B, a second tray 80 is a rectangle (oblong) in its plan view, the length along with the front and rear direction, which serves as the transport direction H, being longer than the width in the left and right direction, and has a boat-like shape with four corners diagonally cut off in plan view. The second tray 80 is constituted by a tray body 81 and a pair of front and rear flanges 82. The pair of front and rear flanges 82 are provided to protrude along the left and right direction of the tray body 81 at both ends of the tray body 81 in the front and rear direction. An article placement portion 83 for placing the article 90 is formed on an upper surface of the tray body 81 and between the pair of front and rear flanges 82. In the second tray 80, the length of the tray body 81 in the front and rear direction is much longer than the width of the tray body 81 in the left and right direction. Therefore, in a case where the four corners of the shape of the second tray 80 in plan view are not diagonally cut off, when the second tray 80 is transported in a curved path or the like in which the first tray 70 is stably transported, the four corners of the tray body 81 in plan view collide with a guide rail or the like, which is not illustrated. Therefore, as illustrated in FIG. 4A, the second tray 80 has inclined portions 84 obtained by diagonally cutting off the four corners of the tray body 81 in plan view. By providing the inclined portions 84 in the four corners of the tray body 81 of the second tray 80, it is possible to make the transport trajectory of the second tray 80 on a belt conveyor 12 similar to the transport trajectory of the first tray 70.

As illustrated in FIG. 3A, FIG. 3B, FIG. 4A, and FIG. 4B, in the second tray 80, the length of the tray body 81 in the front and rear direction is formed to be longer than the length of the tray body 81 of the first tray 70 in the front and rear direction. Therefore, compared with the article 90 placed on the first tray 70, a longer article 90 is mainly placed on the second tray 80.

As illustrated in FIG. 5A and FIG. 5B, the flange 82 of the second tray 80 is significantly different in shape from the flange 72 of the first tray 70. More specifically, in the second tray 80, the flange 82 is formed to be thicker in the front and rear direction than the flange 72 of the first tray 70.

As illustrated in FIG. 1 and FIG. 2, in the tray transport conveyor unit 11 that transports the first tray 70 and the second tray 80, a plurality of belt conveyors 12 are arranged along the transport path. The belt conveyor 12 is mainly constituted by a pair of belts 13 that form a transport surface 13a in contact with bottom surfaces of both ends of the first tray 70 and the second tray 80 in a width direction, a belt holder 14 that holds the belts 13, a driving pulley 15 and a driven pulley 16 that actuate the belts 13, and a motor 17 for rotating the driving pulley 15. Note that the belt conveyor 12 is not limited to the configuration constituted by the pair of belts 13, and may be constituted by, for example, a flat belt that forms the transport surface in contact with the entire bottom surfaces of the first tray 70 and the second tray 80.

In the article transport conveyor unit 21 that transports the article 90, at least in the transport path near where the article 90 is fed to the first tray 70 and the second tray 80, a plurality of belt conveyors 22 are arranged along the tray transport conveyor unit 11 above the tray transport conveyor unit 11. The belt conveyor 22 is mainly constituted by a flat belt 23 that forms a transport surface 23a for the article 90, a belt holder 24 that holds the flat belt 23, a driving pulley 25 and a driven pulley 26 that actuate the flat belt 23, and a motor 27 for rotating the driving pulley 25. In the article transport conveyor unit 21, an inclined conveyor 28 is arranged at the end of the continuous belt conveyors 22. The inclined conveyor 28 feeds the articles 90 transported by the belt conveyors 22 to the first tray 70 and the second tray 80 that are transported by the tray transport conveyor unit 11.

As illustrated in FIG. 1 and FIG. 2, the detection sensor unit 30 is provided downstream from the transport path of the article 90 formed by the article transport conveyor unit 21, and on the side of the tray transport conveyor unit 11. The detection sensor unit 30 is constituted by a detection start sensor 31, an article detection sensor 32, detection end sensors 33 and 34, a tray identification sensor 35 (an example of "tray identification unit"), a rear upward protrusion detection sensor 36, a front upward protrusion detection sensor 37, rear protrusion detection sensors 38 and 39 (examples of "protrusion detection unit"), and front protrusion detection sensors 40 and 41 (examples of "protrusion detection unit").

The detection start sensor 31 is a sensor for causing the article detection sensor 32 to start detection of the article 90. The detection start sensor 31 is arranged on the side of the belt conveyor 12, and at a height that allows detection of a lower front end portion 71a of the tray body 71 of the first tray 70 and a lower front end portion 81a of the tray body 81 of the second tray 80 that are transported on the belt conveyor 12. When the detection start sensor 31 detects the lower front end portion 71a of the tray body 71 of the first tray 70, and the lower front end portion 81a of the tray body 81 of the second tray 80, detection of the article 90 by the article detection sensor 32 is started.

The article detection sensor 32 detects the article 90 placed on the article placement portion 73 of the first tray 70 or the article placement portion 83 of the second tray 80. The article detection sensor 32 is arranged on the side of the belt conveyor 12, and at a height that allows detection of the article 90 placed on the article placement portion 73 of the first tray 70 or the article placement portion 83 of the second tray 80. When the article detection sensor 32 detects the article 90, it is determined that the article 90 is placed on the article placement portion 73 of the first tray 70 or the article placement portion 83 of the second tray 80.

The detection end sensors 33 and 34 are sensors for ending the detection of the article 90 by the article detection sensor 32. The detection end sensors 33 and 34 are arranged on the side of the belt conveyor 12, and at a height that allows detection of the lower front end portion 71a of the tray body 71 of the first tray 70 and the lower front end portion 81a of the tray body 81 of the second tray 80 that are transported on the belt conveyor 12. When the first detection end sensor 33 detects the lower front end portion 71a of the tray body 71 of the first tray 70, the detection of the article 90 on the first tray 70 by the article detection sensor 32 is completed. When the second detection end sensor 34 detects the lower front end portion 81a of the tray body 81 of the second tray 80, the detection of the article 90 on the second tray 80 by the article detection sensor 32 is completed.

The tray identification sensor 35 is a tray identification unit for identifying the types of trays transported on the belt conveyor 12. More specifically, the tray identification sensor 35 identifies the second tray 80. The tray identification sensor 35 is arranged on the side of the belt conveyor 12, and at a height that allows detection of the flange 82 of the second tray 80. As illustrated in FIG. 5B, the tray identification sensor 35 is arranged at the position that allows detection of the flange 82 of the second tray 80 at the same time that the first detection end sensor 33 detects the lower front end portion 81a of the tray body 81 of the second tray 80. When the tray identification sensor 35 detects the flange 82 of the second tray 80, it is determined that the tray transported on the belt conveyor 12 is the second tray 80. Here, as described above, the flange 82 of the second tray 80 is significantly different in shape from the flange 72 of the first tray 70. Therefore, the tray identification sensor 35 indirectly identifies whether the tray transported on the belt conveyor 12 is the first tray 70 or the second tray 80, by detecting only the flange 82 of the second tray 80 that is different in shape from the flange 72 of the first tray 70.

The rear upward protrusion detection sensor 36 is a sensor that detects protrusion of the article 90 on an upper surface of the rear flange 72 of the first tray 70 and an upper surface of the rear flange 82 of the second tray 80. The rear upward protrusion detection sensor 36 is arranged on the side of the belt conveyor 12, and at a height that allows detection of the vicinity of the upper surface of the rear flange 72 of the first tray 70 and the vicinity of the upper surface of the rear flange 82 of the second tray 80. The rear upward protrusion detection sensor 36 is arranged spaced apart from the second detection end sensor 34 by a length that is substantially the same as the length between the lower front end portion 81a of the tray body 81 of the second tray 80 and the rear flange 72. When the rear upward protrusion detection sensor 36 detects the article 90 on the upper surface of the rear flange 72 and the upper surface of the rear flange 82, it is determined that the article 90 placed on the first tray 70 or the second tray 80 is protruding from the upper surface of the rear flange 72 or the upper surface of the rear flange 82.

The front upward protrusion detection sensor 37 is a sensor that detects the article 90 above the upper surface of the front flange 72 of the first tray 70 and the upper surface of the front flange 82 of the second tray 80. The front upward protrusion detection sensor 37 is arranged on the side of the belt conveyor 12, and at a height that allows detection of the vicinity of the upper surface of the front flange 72 of the first tray 70 and the vicinity of the upper surface of the front flange 82 of the second tray 80. The front upward protrusion detection sensor 37 is arranged spaced apart from the rear upward protrusion detection sensor 36 by a length that is substantially the same as the length between the front flange 72 and the rear flange 72 of the first tray 70. When the front upward protrusion detection sensor 37 detects the article 90 on the upper surface of the front flange 72 and the upper surface of the front flange 82, it is determined that the article 90 placed on the first tray 70 or the second tray 80 is protruding from the upper surface of the front flange 72 or the upper surface of the front flange 82.

The rear protrusion detection sensors 38 and 39 are sensors that detect the article 90 in the rear inclined portions 84 of the second tray 80. In the transport device 10, in order to make the transport trajectory of the second tray 80 on the belt conveyor 12 similar to the transport trajectory of the first tray 70, the inclined portions 84 are formed in the four corners of the tray body 81 of the second tray 80. As a result, in the boat-like shaped second tray 80, it is necessary to detect protrusion of the article 90 from the inclined portions 84 of the second tray 80, which is not a problem with the rectangular first tray 70, by the rear protrusion detection sensors 38 and 39 and the front protrusion detection sensors 40 and 41. The first rear protrusion detection sensor 38 and the second rear protrusion detection sensor 39 are provided on the side of the belt conveyor 12. The first rear protrusion detection sensor 38 and the second rear protrusion detection sensor 39 are arranged at positions that are opposite each other across the belt conveyor 12. The rear protrusion detection sensors 38 and 39 are arranged at a height that allows detection of the article 90 placed on the article placement portion 83 of the second tray 80, and at positions that allows detection of the article 90 along the inclination of the rear inclined portions 84 of the second tray 80. When the rear protrusion detection sensors 38 and 39 detect the article 90 on the rear inclined portions 84 of the second tray 80, it is determined that the article 90 placed on the second tray 80 is protruding from the rear inclined portions 84 of the second tray 80. Note that, in FIG. 4B, although the rear protrusion detection sensor 38 (the rear protrusion detection sensor 39 as well) detects the article 90 downward from the position higher than the article placement portion 83 of the second tray 80, this is not a limitation. The rear protrusion detection sensors 38 and 39 may detect the article 90 upward from positions lower than the article placement portion 83 of the second tray 80, or may detect the article 90 horizontally.

The front protrusion detection sensors 40 and 41 are sensors that detect the article 90 on the front inclined portions 84 of the second tray 80. The first front protrusion detection sensor 40 and the second front protrusion detection sensor 41 are provided on the side of the belt conveyor 12. The first front protrusion detection sensor 40 and the second front protrusion detection sensor 41 are arranged at positions that are opposite each other across the belt conveyor 12. The front protrusion detection sensors 40 and 41 are arranged at a height that allows detection of the article 90 placed on the article placement portion 83 of the second tray 80, and at positions that allow detection of the article 90 along the inclination of the front inclined portions 84 of the second tray 80. When the front protrusion detection sensors 40 and 41 detect the article 90 on the front inclined portions 84 of the second tray 80, it is determined that the article 90 placed on the second tray 80 is protruding from the front inclined portions 84 of the second tray 80. Note that, in FIG. 4B, although the front protrusion detection sensor 40 (the front protrusion detection sensor 41 as well) detects the article 90 downward from the position higher than the article placement portion 83 of the second tray 80, this is not a limitation. The front protrusion detection sensors 40 and 41 may detect the article 90 upward from positions lower than the article placement portion 83 of the second tray 80, or may detect the article 90 horizontally.

The controller 50 is connected to each of the units (the tray transport conveyor unit 11, the article transport conveyor unit 21, and the detection sensor unit 30) of the transport device 10, and controls each of the units of the transport device 10. Note that the determination by each sensor of the above-described detection sensor unit 30 is performed by the controller 50.

Protrusion detection of the article 90 on the first tray 70 and the second tray 80 will be described.

In the transport device 10, the detection sensor unit 30 detects whether the article 90 is placed on the article placement portion 73 of the first tray 70 and the article placement portion 83 of the second tray 80, and subsequently identifies the type of the tray transported on the belt conveyor 12, so as to detect the protrusion of the article 90 on the first tray 70 and the second tray 80.

As illustrated in FIGS. 3A to 6, when the detection start sensor 31 detects the lower front end portion 71a of the tray body 71 of the first tray 70 or the lower front end portion 81a of the tray body 81 of the second tray 80 transported on the belt conveyor 12 (S1), the detection of the article 90 by the article detection sensor 32 is started (S2). The article detection sensor 32 detects the article 90 until the first detection end sensor 33 detects the lower front end portion 71a of the tray body 71 of the first tray 70 or the lower front end portion 81a of the tray body 81 of the second tray 80 (S3).

When the first tray 70 or the second tray 80 is transported on the belt conveyor 12, and the first detection end sensor 33 detects the lower front end portion 71a of the tray body 71 of the first tray 70 or the lower front end portion 81a of the tray body 81 of the second tray 80 (S4), the tray identification sensor 35 identifies the type of the tray transported on the belt conveyor 12. More specifically, whether or not the tray transported on the belt conveyor 12 is the second tray 80 is determined by the detection of the tray identification sensor 35 (S5).

When it is determined that the tray transported on the belt conveyor 12 is not the second tray 80 (S5—No), that is, when it is identified that the tray transported on the belt conveyor 12 is the first tray 70, the article detection sensor 32 ends the detection of the article 90 (S6). When the detection of the article 90 by the article detection sensor 32 ends (S6), the rear upward protrusion detection sensor 36 and the front upward protrusion detection sensor 37 start the detection of the article 90, so as to determine the protrusion of the article 90 from the upper surfaces of both the front and rear flanges 72 of the first tray 70 (S7). When it is determined that the article 90 is protruding from the upper surfaces of the flanges 72 (S7—Yes), transportation of the first tray 70 is stopped (S8), and a fact that the article 90 is protruding from the upper surfaces of the flanges 72 is displayed as an abnormality on a monitor, which is not illustrated (S9). Further, when the protrusion of the article 90 from the upper surfaces of the flanges 72 are corrected by an operator, the transportation of the first tray 70 is restarted (S10). When it is determined that the article 90 is not protruding from the upper surfaces of the flanges 72 (S7—No), the first tray 70 is transported on the belt conveyor 12 as it is.

On the other hand, when by the detection of the tray identification sensor 35 it is determined that the tray transported on the belt conveyor 12 is the second tray 80 (S5—Yes), the detection of the article 90 by the article detection sensor 32 is continuously performed (S11). Further, when the front upward protrusion detection sensor 37 starts the detection of the article 90, the protrusion of the article 90 from the upper surface of the front flange 82 of the second tray 80 is determined (S12). When it is determined that the article 90 is protruding from the upper surface of the front flange 82 (S12—Yes), the transportation of the second tray 80 is stopped (S13), and a fact that the article 90 is protruding from the upper surface of the flange 82 is displayed as an abnormality on the monitor, which is not illustrated (S14). Further, when the protrusion of the article 90 is corrected by the operator, the transportation of the second tray 80 is restarted (S15).

On the other hand, in a case where it is determined that the article 90 is not protruding from the upper surface of the front flange 82 (S12—No), when the second tray 80 is transported on the belt conveyor 12, and the second detection end sensor 34 detects the lower front end portion 81a of the tray body 81 of the second tray 80 (S16), the detection of the article 90 on the second tray 80 by the article detection sensor 32 ends (S17). Additionally, at the same time, when the rear upward protrusion detection sensor 36, the rear protrusion detection sensors 38 and 39, and the front protrusion detection sensors 40 and 41 start the detection of the article 90, the protrusion of the article 90 from the upper surface of the rear flange 82 of the second tray 80, the rear inclined portions 84 of the second tray 80, and the front inclined portions 84 of the second tray 80 is determined (S18). When it is determined that the article 90 is protruding from at least one of the upper surface of the rear flange 82 of the second tray 80, the rear inclined portions 84 of the second tray 80, and the front inclined portions 84 of the second tray 80 (S18—Yes), the transportation of the second tray 80 is stopped (S13), and a fact that the article 90 is protruding from at least one of the upper surface of the rear flange 82, the rear inclined portions 84 of the second tray 80, and the front inclined portions 84 of the second tray 80 is displayed as an abnormality on the monitor, which is not illustrated (S14). Further, when the protrusion of the article 90 is corrected by the operator, the transportation of the second tray 80 is restarted (S15). When it is determined that the article 90 is not protruding from any of the upper surface of the rear flange 82 of the second tray 80, the rear inclined portions 84 of the second tray 80, and the front inclined portions 84 of the second tray 80 (S18—No), the second tray 80 is transported on the belt conveyor 12 as it is.

In this manner, in the transport device 10, the detection range of the article 90 protruding from the front and rear ends of a tray is changed according to the type (the first tray 70 or the second tray 80) of the tray identified by the tray identification sensor 35. More specifically, when the tray identification sensor 35 identifies the first tray 70, the protrusion of the article 90 on the upper surfaces of the front and rear flanges 72 of the first tray 70 is detected. On the other hand, when the tray identification sensor 35 identifies the second tray 80, in addition to the protrusion of the article 90 on the upper surfaces of the front and rear flanges 82 of the second tray 80, the protrusion of the article 90 on the front and rear inclined portions 84 of the second tray 80 is detected.

As described above, according to the present embodiment, after identifying the type of a tray from the shapes of the flanges of the tray (the shapes of the flanges 82 of the second tray 80), the protrusion of the article 90 from the first tray 70 and the second tray 80 can be detected. Therefore, even when the first tray 70 and the second tray 80 of different types are transported in a mixed condition, the protrusion of the article 90 from the first tray 70 and the second tray 80 can be accurately detected according to the types of the trays.

Note that, in the present embodiment, although the article 90 placed on the article placement portion 73 of the first tray 70 or the article placement portion 83 of the second tray 80 is detected by one article detection sensor 32, this is not a limitation. As illustrated in FIG. 7, a plurality of (three in FIG. 7) article detection sensors 32a, 32b, and 32c may detect the article 90 placed on the article placement portion 73 of the first tray 70 or the article placement portion 83 of the second tray 80. In this case, the article detection sensors 32a, 32b, and 32c are arranged along the side of the belt conveyor 12 at a height that allows detection of the article 90 placed on the article placement portion 73 of the first tray 70 or the article placement portion 83 of the second tray 80.

In this case, when the detection start sensor 31 detects the lower front end portion 71a of the tray body 71 of the first tray 70 or the lower front end portion 81a of the tray body 81 of the second tray 80, the front upward protrusion detection sensor 37 detects whether or not the article 90 exists on the upper surface of the front flange 72 of the first tray 70 or the upper surface of the front flange 82 of the second tray 80. At the same time, the article detection sensors 32a, 32b, and 32c start the detection of the article 90 placed on the article placement portion 73 of the first tray 70 or the article placement portion 83 of the second tray 80.

When the first tray 70 or the second tray 80 is transported on the belt conveyor 12, and the second detection end sensor 34 detects the lower front end portion 71a of the tray body 71 of the first tray 70 or the lower front end portion 81a of the tray body 81 of the second tray 80, the article detection sensors 32a, 32b, and 32c complete the detection of the article 90 placed on the article placement portion 73 of the first tray 70 or the article placement portion 83 of the second tray 80, and at the same time, the tray identification sensor 35 identifies whether the tray transported on the belt conveyor 12 is the first tray 70 or the second tray 80.

When the tray identification sensor 35 determines that the tray is the first tray 70, a first rear upward protrusion detection sensor 36a detects whether or not the article 90 exists on the upper surface of the rear flange 72 of the first tray 70. When the tray identification sensor 35 determines that the tray is the second tray 80, a second rear upward protrusion detection sensor 36b detects whether or not the article 90 exists on the upper surface of the rear flange 82 of the second tray 80. At the same time, the rear protrusion detection sensors 38 and 39, and the front protrusion detection sensors 40 and 41 detect whether or not the article 90 exists on the rear inclined portions 84 of the second tray 80, and the front inclined portions 84 of the second tray 80.

In this manner, since the article detection sensors 32a, 32b, and 32c detect the article 90 placed on the article placement portion 73 of the first tray 70 or the article placement portion 83 of the second tray 80, the range of the sensors installed on the side of the belt conveyor 12 can be narrowed. Therefore, the detection sensor unit 30 can be made compact.

Additionally, in the present embodiment, although the tray identification sensor 35 identifies the types of the trays by detecting the difference in shape between the flange 72 of the first tray 70 and the flange 82 of the second tray 80, this is not a limitation. For example, the tray identification sensor 35 may identify the types of the trays by detecting the difference in shape between other portions other than the flanges (the flanges 72 and the flanges 82) of the tray body 71 of the first tray 70 and the tray body 81 of the second tray 80. More specifically, a projecting portion is formed only in the tray body 81 of the second tray 80, and the second tray 80 is identified by detecting the projecting portion by the tray identification sensor 35.

Further, the types of the trays may be identified by measuring the dimensions of the tray body 71 of the first tray 70 and the tray body 81 of the second tray 80 by the tray identification sensor 35. For example, the types of the trays are identified by measuring the lengths of the tray body 71 of the first tray 70 and tray body 81 of the second tray 80 in a front and rear length direction by the tray identification sensor 35.

Further, an identifier, such as a barcode, a QR Code (registered trademark), or an RFID (Radio Frequency Identification), may be attached to the first tray 70 and the second tray 80, and the types of the trays may be identified by reading the identifier by a reading unit provided around the belt conveyor 12. For example, a barcode that allows identification of each tray is attached to each of the first tray 70 and the second tray 80, and the first tray 70 and the second tray 80 are identified by reading the barcode by a barcode reader provided on the side of the belt conveyor 12.

Further, a camera (an example of "photographing unit") that photographs the first tray 70 and the second tray 80 may be provided on the side of the belt conveyor 12, above the belt conveyor 12, or the like, and the types of the trays may be identified based on an image photographed by the camera. For example, the camera is provided above the belt conveyor 12, and the first tray 70 and the second tray 80 are identified by analyzing the image photographed by the camera from above the first tray 70 and the second tray 80.

Additionally, in the present embodiment, although the types (the first tray 70 and the second tray 80) of the trays transported on the belt conveyor 12 are identified by identifying only the second tray 80 by the tray identification sensor 35, this is not a limitation. The types of the trays may be identified by identifying only the first tray 70 by the tray identification sensor 35.

Additionally, in the present embodiment, although when the rear upward protrusion detection sensor 36, the front upward protrusion detection sensor 37, the rear protrusion detection sensors 38 and 39, and the front protrusion detection sensors 40 and 41 detect the protrusion of the article 90, the transportation of the first tray 70 or the second tray 80 is stopped, this is not a limitation. When the protrusion of the article 90 is detected, the corresponding first tray 70 or second tray 80 may be guided to another transport path (for example, a dedicated conveyor unit that transports only a tray in which the protrusion of the article 90 has been detected), without being stopped on the tray transport conveyor unit 11 (the belt conveyor 12), the protrusion of the article 90 may be corrected, and thereafter, the corresponding first tray 70 or second tray 80 may be merged again into the tray transport conveyor unit 11 (the belt conveyor 12). With such a configuration, since a tray in which the protrusion of the article 90 has been detected is not stopped on the tray transport conveyor unit 11 (the belt conveyor 12), it is possible to continue transportation of the subsequent trays, without stopping the transportation.

Additionally, in the present embodiment, although the detection start sensor 31 is arranged at the height that allows detection of the lower front end portion 71a of the first tray 70 and the lower front end portion 81a of the second tray 80 that are transported on the belt conveyor 12, this is not a limitation. The article detection sensor 32 may be at a position that allows starting the detection of the article 90 on the first tray 70 and the second tray 80 at the timing when the detection start sensor 31 detects the first tray 70 and the second tray 80.

Additionally, in the present embodiment, although the protrusion of the article 90 from the upper surface of the front flange 82 of the second tray 80, and the protrusion of the article 90 from the upper surface of the rear flange 82 of the second tray 80 are separately detected at different timings (after the first detection end sensor 33 detects the second tray 80 (S4), and after the second detection end sensor 34 detects the second tray 80 (S16)), this is not a limitation. For example, at any timing of the timing when the detection start sensor 31 detects the second tray 80, the timing when the first detection end sensor 33 detects the second tray 80, or the timing when the second detection end sensor 34 detects the second tray 80, the protrusion of the article 90 from the upper surface of the front flange 82 of the second tray 80, and the protrusion of the article 90 from the upper surface of the rear flange 82 of the second tray 80 may be detected at the same time.

Additionally, in the present embodiment, although the detection of the article 90 by the rear upward protrusion detection sensor 36 and the front upward protrusion detection sensor 37 (S7, S12) is performed after the tray identification sensor 35 detects the second tray 80 (S5), this is not a limitation. For example, it may be performed at the same time when the first detection end sensor 33 detects the first tray 70 or the second tray 80 (S4), and the tray identification sensor 35 detects the second tray 80 (S5). That is, when the first detection end sensor 33 detects the first tray 70 or the second tray 80, the identification of the tray, and the detection of the protrusion of the article 90 from the upper surfaces of the flanges of the tray may be started at the same time.

REFERENCE SIGNS LIST

10 Transport Device
35 Tray Identification Sensor (Tray Identification Unit)
38 First Rear Protrusion Detection Sensor (Protrusion Detection Unit)
39 Second Rear Protrusion Detection Sensor (Protrusion Detection Unit)
40 First Front Protrusion Detection Sensor (Protrusion Detection Unit)
41 Second Front Protrusion Detection Sensor (Protrusion Detection Unit)
70 First Tray (Tray)
80 Second Tray (Tray)
90 Article

What is claimed is:

1. A transport device that transports a plurality of trays of different types on which articles can be placed, the transport device comprising:
   a tray identification unit that identifies the types of the trays; and
   a protrusion detection unit that detects the articles placed protruding from the trays,
   wherein the tray identification unit identifies the types of the trays by detecting characteristics of the trays,
   wherein the tray identification unit identifies the types of the trays by detecting shapes of the trays, and
   wherein the protrusion detection unit detects the articles according to the types of the trays identified by the tray identification unit.

2. The transport device according to claim 1,
   wherein the tray identification unit identifies the types of the trays by measuring dimensions of the trays.

3. The transport device according to claim 1,
   wherein the tray identification unit identifies the types of the trays by detecting identifiers provided to the trays.

4. The transport device according to claim 1, comprising:
   a photographing unit that photographs the trays,
   wherein the tray identification unit identifies the types of the trays based on images photographed by the photographing unit.

5. The transport device according to claim 1,
   wherein the protrusion detection unit detects protrusion of the articles from front and rear ends of the trays with respect to a transport direction of the trays.

6. A transport device that transports a plurality of trays of different types on which articles can be placed, the transport device comprising:
   a tray identification unit that identifies the types of the trays; and
   a protrusion detection unit that detects the articles placed protruding from the trays, wherein the tray identification unit identifies the types of
the trays by detecting characteristics of the trays, wherein the protrusion detection unit detects the articles
according to the types of the trays identified by the tray
identification unit, and wherein the protrusion detection unit changes a detection
range of the articles protruding from front and rear ends
of the trays with respect to a transport direction of the
trays, according to the types of the trays identified by
the tray identification unit.

\* \* \* \* \*